3,364,099
FIBROUS NIOBIUM CARBIDE AND NITRIDE
William O. Forshey, Jr., New Castle, and Harold F. Ring, Wilmington, Del., assignors to E. I. du Pont de Nemours and Company, Wilmington, Del., a corporation of Delaware
No Drawing. Filed Oct. 3, 1963, Ser. No. 313,439
3 Claims. (Cl. 161—181)

This invention relates to new superconductors and to their preparation and more specifically to superconducting niobium carbide and nitride products in the shape of fibers, films and plates.

Niobium carbide and niobium nitride are old compounds and have indeed been reported to exhibit certain superconducting properties. However, the previous reports concerning these compounds disclosed only bulk materials and syntheses therefor, which bulk (nonfibrous) materials, while exhibiting certain superconducting ranges, were not particularly outstanding therein.

The present invention is concerned with specific shapes of niobium carbide and niobium nitride, which shapes have at least one dimension small with respect to at least one other, i.e., fibers and films or plates, and to methods for the preparation of such materials. Chemically and by such fundamental description as proximate elemental analysis, the present compositions do not significantly differ from the previously reported bulk niobium carbide and niobium nitride. However, surprisingly in their physical properties the present materials are significantly different from the previously known bulk products, particularly in their superconducting behavior. They exhibit a higher critical (Curie) temperature in ° K. ($T_c$) and a higher current carrying capacity in amperes/cm.$^2$, i.e., $I_c$ at critical field as a function of both temperature and field ($H_c$), than the prior art products. In other words, the critical current of our novel materials is much greater than that of the prior art materials for all values of field and temperature, and, in particular, for all values of field at $T=4.2°$ K., where superconductors are usually employed. Additionally, the fibrous products of this invention are highly flexible and feltable.

Our new fibrous and plate-shaped products can be prepared in several ways with considerably more variety operable in the synthesis of the shaped niobium carbide products. Thus, niobium carbide fibers and plates can be prepared by reaction of niobium pentachloride, nitrogen, and carbon or a source thereof at the reaction temperature in a suitable refractory tube, preferably one containing silica, at temperatures in the range 1300–1450° C. to as high as 1700° C. Niobium carbide fibers can also be prepared under suitably controlled, essentially zone-refining techniques by direct reaction of niobium and carbon at 1800° C. and higher. Other possible methods of preparation include reaction of $Nb_2O_3$ with carbon in a hydrogen atmosphere at 1200° C., elemental niobium with carbon in a hydrogen atmosphere at 1700° C. and higher, and from a mixture of niobium chloride and hydrogen in the vapor phase with added hydrocarbons passed through and over an incandescent source, e.g., a tungsten wire filament under suitable gap conditions.

The first just described synthesis of niobium carbide, i.e., from the pentachloride, nitrogen, and carbon in a silica refractory, is particularly unexpected in that the corresponding reaction with a titanium base, i.e., using titanium tetrachloride, results in the formation of substantially pure titanium nitride rather than as is obtained here, the pure niobium carbide—this latter being surprisingly obtained in very high purity and good yield, albeit the reaction is carried out in an atmosphere of nitrogen. While the niobium nitride products of the present invention cannot be prepared by substituting niobium pentachloride in the previously reported titanium tetrachloride reaction, such products can be prepared readily from niobium pentachloride and nitrogen in a hydrogen atmosphere at 1350° C. and higher. Preferably, the hydrogen is passed into the reaction zone and when its flow rate is maintained at 30–50 cc./minute fiber formation is favored. Other reducing agents which may be used to replace $H_2$ include $NH_3$, Mg, Al, and Si.

The fibrous niobium carbide of the present invention exhibits a significantly higher transition temperature, i.e., $T_c$, than the previously reported bulk niobium carbide. The latter has been reported as exhibiting a transition temperature no higher than 11.1° K.; whereas, the fibrous niobium carbide of this invention has exhibited a transition temperature as unexpectedly high as 17.3° K. Similarly, the fibrous niobium nitride of the present invention exhibits a reasonably higher transition temperature of 17° K., as compared with reported transition temperature of approximately 15° K. In both instances, for mechanical properties and superior handling characteristics in the fabrication of elements and devices based on these fibrous materials, as well as for improved electrical behavior, it is preferred that the fibrous products exhibit certain dimensional ratios, i.e., length to width of 50 to 10,000. Normally speaking, the fibrous materials will range in fiber diameter from .01 micron to 20 microns and will normally be as to length in the range 0.1 millimeter to 1 centimeter.

The following examples are submitted to further illustrate but not to limit the present invention.

EXAMPLE I

Two alumina boats (4" x ½" x ½") were each charged with 5 g. of carbon black beads (25 mesh and smaller) and placed end to end in the center of a 36-inch-long 1½" O.D. x 1¼" I.D. commercial sillimanite (a 1/1 alumina/silica) refractory reaction tube. The tube and its contents were heated to 1425° C. for 16 hours, during which time 6 g. of niobium pentachloride was slowly sublimed into the reaction tube in a stream of nitrogen flowing at a rate of about 25 cc./minute. At the conclusion of the run, the upstream alumina boat contained a deposit of fine needles and small plates exhibiting a yellow metallic luster. X-ray analysis of the fibrous product showed it to be very pure niobium carbide with a cell constant of 4.470 versus values of 4.4702–4.4704±0.0005 as reported by Storms and Krikorian, J. Phys. Chem. 63, 1747 (1959). The fibrous niobium carbide which had a length to width ratio of about 60:1 exhibited a superconduction critical temperature of 17° K., a critical field ($H_c$) measured at 15.5° K. of well above 20,000 oersteds, and a rate of change of field strength with superconduction temperature $$\left(\frac{\partial H_c}{\partial T}\right)_{T=17° K.}$$

of approximately 25,000 oersteds/° K. The product upon which the above reported measurements were made was approximately ¼" long and 100 microns in diameter.

EXAMPLE II

Using the same general preparative setup as in Example I, a single alumina boat was charged with 5 g. of carbon black beads and heated at 1430–1440° C. in a sillimanite refractory tube for 4¼ hours, during which time 7.85 parts of niobium pentachloride was sublimed into the reaction zone in a gas stream of from 10 to 20 cc./minute of nitrogen and 15 cc./minute of argon. At the end of the reaction period, the boat contained a deposit of fine niobium carbide needles and fibers up to ¼" in length and small microcrystals of niobium carbide with a yellow metallic luster. On separaiton and examination, the fibrous niobium carbide product exhibited a superconduction critical temperature of 14° K. A 10-micron diameter niobium carbide fiber from this run having a length to width ratio of 500 exhibited a critical current at 4.2° K. of 17,000 amperes/sq. cm.

EXAMPLE III

Example I was substantially repeated except that the reaction temperature was 1360–1385° C., the reaction time was 7.5 hours, and 7.9 g. of niobium pentachloride was sublimed into the reaction zone over the reaction period using a 1:1 nitrogen/argon gas mixture flowing at the rate of 36 cc./minute. The upstream boat contained a deposit of both needles and plates of mixed niobium carbide/niobium nitride, i.e., single crystals of the mixed phases. X-ray analysis indicated the fibrous mixed crystals to exhibit a cell constant of 4.4464. Analysis of the mixed single crystals showed a 0.96% nitrogen content which corresponds to a mixed crystal containing 92.7% niobium carbide and 7.3% niobium nitride. The superconduction critical temperature of the fibers of the mixed crystals was 13° K. The downstream boat from the same synthesis contained a mixture of fibers and needles of niobium carbide/niobium nitride mixed crystals exhibiting an X-ray cell constant of 4.4583.

The acicular products of this example varied in dimensions from diameters of 10 to 200 microns and lengths of from 1/8 to 1/4". The finer fibers were quite flexible and could be bent through an approximately 180° arc.

EXAMPLE IV

An empty alumina boat of the type described previously in Example I was placed in a sillimanite refractory tube, also of the type described in Example I. The reactor was fitted with a concentric quartz tube which extended from the cold end of the reactor to the center of the hot zone. The assembly was heated to 1350° C. (internal temperature) for three hours, during which time 7.6 parts of niobium pentachloride was sublimed into the reaction zone through the quartz inlet tube using a 40 cc./minute stream of dry nitrogen as a carrier. Simultaneously, hydrogen at the rate of 70 cc./minute was passed into the reactor through the annular space between the quartz tube and the sillimanite refractory tube. A light tan deposit of niobium nitride was obtained on the inside space of the quartz tube in the center of the furnace and niobium nitride rosettes in the form of short, very fine niobium nitride fibers were obtained at the bottom of the alumina boat. A sample of this product from a similar run on X-ray analysis was shown to be niobium nitride with a cell constant of 4.388. This material exhibited a superconduction critical temperature of 15° K.

EXAMPLE V

Using the same general preparative setup as in Example I, 10 parts of aluminum fluoride was placed in an alumina boat in the center of the reactor upstream of and touching end-to-end a second alumina boat containing 10 parts of metallic silicon. The reactor was heated at 1550° C. for 16 hours, during which time 15 parts of niobium pentachloride was sublimed into the reaction zone in a gas stream of about 35 cc./minute of nitrogen. At the end of the reaction period, the adjacent ends of the two alumina boats contained a deposit of long, fine niobium nitride fibers and niobium nitride needles and plates with a golden metallic luster. The fibrous niobium nitride product exhibited a superconduction critical temperature of 17° K. This product on X-ray spectrum analysis exhibited a clean sharp X-ray pattern for NbN and a lattice constant of 4.3920 which corresponds to the extrapolated literature lattice constant for pure NbN with essentially no lattice vacancies.

While the present invention is generic to fibers and plates of niobium carbide and niobium nitride broadly including the previously described, broadly defined axial diameters and length-to-width ratios, the most preferred materials are those in fiber form exhibiting fiber diameters of less than 20 microns. These preferred materials exhibit outstanding superconducting properties. Thus, niobium carbide needles having diameters of 80 to 170 microns exhibit critical currents generally of less than 1000 amperes/sq.cm. when measured at 4.2° K. On the other hand, fibrous products of these materials with diameter less than 20 microns exhibit markedly higher critical current values as per the data given in Example II. The critical current values go up rapidly with the decrease in fiber diameter below this critical range of about 20 microns. Thus, a niobium carbide fibrous product with a 6.5 micron diameter exhibits a critical current of approximately 30,000 amperes/sq. cm. Furthermore, a fiber sample of niobium carbide with a diameter of only 2.5 microns exhibits a still markedly higher critical current of 70,000 amperes/sq. cm.

While niobium carbide and niobium nitride have been previously reported as compounds and, indeed, have also been previously reported to exhibit certain superconducting properties, such previously reported work has been solely limited to niobium carbide and nitride in gross bulk form without any definitely described or allegedly necessary physical shape. These compounds in this previously reported gross bulk form, because of necessary physical limitations attached to such form, were of limited utility and, in fact, could not be used to the maximum capabilities, electrically speaking, inherent in the products because of these limited physical forms. The new materials of the present invention, i.e., niobium carbide and niobium nitride in fibrous or plate form, are not so limited and actually as a direct function of the new form or shape are useable in a wider variety of applications and are better in physical properties than the previously reported bulk niobium carbide and nitride in the same applications.

The new forms of niobium carbide and niobium nitride which are fibrous in nature are also highly flexible; and this combination of properties permits their use in still wider fields of application. Fibrous niobium carbide and nitride also exhibit high tensile strengths. These new fibrous products generally exhibit a diameter on minimum cross section of less than about 20 microns and also a flexibility, at diameters such as 1 micron, sufficient to permit bending of said fibrous products around a mandrel of 1 mm. diameter without breaking. Generally speaking, these fibrous products will exhibit a length which is the maximum fibrous dimension of at least ten times the given fiber diameter.

The new niobium carbide and nitride fibers and plates have extremely good thermal stability, inertness, and strength. Mats or felts of the fibers ar readily obtained by suspending the fibers in a viscous liquid such as glycerine or in a heavy liquid such as 1,1,2-tetrabromoethane, followed by filtration to remove the dispersing liquid. The mats are useful as filters, e.g., in air to remove solids or to remove bacteria from solutions. They are good thermal insulators, especially where extremely high temperatures are involved. The fibers can be incorporated in plastics to give increased stiffness and tear strength. They are reinforcing agents for fibers or papers. Finely ground fibers of niobium carbide and nitride when incorporated with oils such as silicone oil produce thick greases useful as lubricants.

These new superconducting fibers of niobium carbide and niobium nitride are useful in the preparation of cryotrons, which preparations are well known in the art (See, for instance, Bremer, "Superconductive Devices," McGraw-Hill, 1962), and more particularly these fibrous products are useful in the formation of wire-wound cryotrons or thin film cryotrons and are also useful in thin film form to produce both field-induced and current-induced transitions in such cryotrons. These cryotrons are operable as circuit components in the so-called binary adders, catalog memories, and tree and matrix circuits. These new fibrous products are also useful in preparing computer memory devices, particularly, for instance, of the type known in the art as an inductively coupled cell or a Crowe cell. These products are also further useful in the well-known superconducting field in the preparation of low-frequency and high-frequency devices, radiation detectors, and the like. They are also useful in the preparation of devices operating with either or both high currents and high fields. They are also useful in electromechanical applications as is known for other superconductors, and in addition also exhibit the tunnel effect when suitably device-fabricated.

The critical current of a compact of oriented niobium carbide and/or niobium nitride and/or mixed crystals of both in fibrous form of the present invention is many orders of magnitude higher than those of corresponding compacts of the previously known bulk niobium carbide or niobium nitride due to the previously described, extremely large increase in critical current (i.e., $I_c$) with decreasing fiber diameter. Accordingly, a compact of the present fibrous superconductors within a processable jacket material on, for instance, drawing or swaging would afford a compacted wire. The jacket material could be any of the known ductile metals and, after the just-described compacting and working, would afford a cored wire exhibiting much higher critical currents and fields than could be similarly obtained using the old, known super-conducting niobium carbide and nitride. Such cored wires exhibit very high current-carrying capabilities in high fields and would be especially useful in such devices as superconducting magnets for general research purposes, masing action, acceleration, plasma physics, and the like; superconducting transformers, rectifiers, tunnel diodes, and other similar electrical devices; superconducting frictionless bearing for gyroscopes, motors, and the like; and similar other related device outlets.

A point particularly worthy of mention with respect to the unusual properties of, and the especially outstanding uses based thereon, the new fibrous and plate-shaped superconducting niobium carbide, niobium nitride, and mixed niobium carbide/nitride crystals is that the high-current, high-field behavior of these materials in the micron size range diameter is completely unexpected. Theory predicts that superconductivity will persist to high fields in thin sections, i.e., when the conductors are in thin film form. When it comes to current carrying capacity at high fields, this is beyond the theory's predictive power. The maximum dimensions of the prior art conductors in the thinnest direction at which high-field capacities are achieved are much less than one to ten microns, and in fact are more significant when the maximum dimension in the thinnest direction is in the range 100–1000 A. Thus, the results obtained with the present shapes of niobium carbide, niobium nitride, and mixed crystals thereof, as per the specific data given in the foregoing detailed examples, are completely unexpected and, so far as presently advised, are inexplicable by any theory of superconductivity.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A superconducting material consisting essentially of a member selected from the class consisting of niobium carbide, niobium nitride and niobium carbide/niobium nitride mixed crystals, said material being further characterized by exhibiting
 (a) a ratio of length to width of 50:1 to 10,000:1,
 (b) a diameter of less than about 20 microns, and
 (c) a high current-carrying capacity at high fields.

2. As a new inorganic fibrous superconductor, niobium carbide characterized in that it is in the form of flexible, feltable fibers, a majority of said fibers having a diameter of no greater than 20 microns with a length of at least 10 times the diameter, a superconduction critical temperature of about 17° K. and a flexibility which when determined on fibers of about 1 micron diameter is sufficient to permit bending around a mandrel of 1 mm. diameter without breaking.

3. As a new inorganic fibrous superconductor, niobium nitride characterized in that it is in the form of flexible, feltable fibers, a majority of said fibers having a diameter no greater than 20 microns with a length of at least 10 times the diameter, a superconduction critical temperature of about 17° K. and a flexibility which when determined on fibers of about 1 micron diameter is sufficient to permit bending around a mandrel of 1 mm. diameter without breaking.

References Cited
UNITED STATES PATENTS

| | | | |
|---|---|---|---|
| 1,991,204 | 2/1935 | Grenagle | 252—516 |
| 2,715,763 | 8/1955 | Marley | 161—181 |
| 3,009,886 | 11/1961 | Wejnarth | 252—516 |
| 3,057,040 | 10/1962 | Cuculo | 161—181 |

FOREIGN PATENTS

| | | |
|---|---|---|
| 481,168 | 2/1952 | Canada. |
| 968,590 | 9/1964 | Great Britain. |
| 1,268,952 | 6/1961 | France. |

ROBERT F. BURNETT, *Primary Examiner.*

EARL M. BERGERT, ALEXANDER WYMAN,
*Examiners.*

A. J. SMEDEROVAC, R. A. FLORES,
*Assistant Examiners.*